United States Patent
Krishnamoorthy et al.

(10) Patent No.: US 10,669,757 B2
(45) Date of Patent: Jun. 2, 2020

(54) VARIABLE POSITION VEHICLE HOOD STAY DEVICE

(71) Applicants: Manimaran Krishnamoorthy, Chennei (IN); Sundaravadivelu Mohan, Chennai (IN)

(72) Inventors: Manimaran Krishnamoorthy, Chennei (IN); Sundaravadivelu Mohan, Chennai (IN)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 16/190,616

(22) Filed: Nov. 14, 2018

(65) Prior Publication Data

US 2019/0162000 A1  May 30, 2019

Related U.S. Application Data (60) Provisional application No. 62/592,731, filed on Nov. 30, 2017.

(51) Int. Cl.
| | |
|---|---|
| *E05C 17/28* | (2006.01) |
| *B62D 25/12* | (2006.01) |
| *E05C 17/18* | (2006.01) |
| *G05G 5/18* | (2006.01) |
| *E05C 17/30* | (2006.01) |
| *E05C 17/08* | (2006.01) |

(52) U.S. Cl.
CPC .............. *E05C 17/28* (2013.01); *B62D 25/12* (2013.01); *E05C 17/08* (2013.01); *E05C 17/18* (2013.01); *E05C 17/30* (2013.01); *G05G 5/18* (2013.01); *E05Y 2900/536* (2013.01)

(58) Field of Classification Search
CPC ......... E05C 17/28; E05C 17/18; B62D 25/12; G05G 5/18; E05Y 2900/536
See application file for complete search history.

(56) References Cited

U.S. PATENT DOCUMENTS

| | | |
|---|---|---|
| 5,791,428 A | 8/1998 | Noll et al. |
| 6,892,843 B2 | 5/2005 | Schillaci et al. |
| 9,156,502 B2 | 10/2015 | Micewicz |
| 9,371,672 B2 | 6/2016 | Tseng et al. |
| 9,546,505 B1 | 1/2017 | McEachern |

(Continued)

FOREIGN PATENT DOCUMENTS

| | | | |
|---|---|---|---|
| DE | 4431657 C1 | 11/1995 | |
| GB | 462076 A | * 3/1937 | ............... B62B 9/14 |

*Primary Examiner* — Vicky A Johnson
(74) *Attorney, Agent, or Firm* — Kalph E. Smith (57) ABSTRACT

A hood stay device for a vehicle includes a housing, support, and latch. A proximal end of the housing is pivotably coupled to the hood or vehicle body. An inner end of the support is within the housing. The support extends through a distal end of the housing to an outer end of the support that is pivotably coupled to the other one of the hood or vehicle body. The support is slidable relative to the housing along an axis and includes teeth arranged in a rack along the axis. The latch is coupled to the housing and movable between locked and unlocked positions relative thereto. When in the locked position, the latch engages the teeth to inhibit movement of the support member along the axis. When in the unlocked position, the latch is apart from the teeth to permit movement of the support along the axis.

14 Claims, 4 Drawing Sheets

(56) References Cited

U.S. PATENT DOCUMENTS

2006/0213709 A1\* 9/2006 Yamaguchi ............. B60R 21/38
                                                                                   180/69.21
2016/0369551 A1 12/2016 Suzuki et al.
2019/0162000 A1\* 5/2019 Krishnamoorthy .... B62D 25/12

\* cited by examiner

VARIABLE POSITION VEHICLE HOOD STAY DEVICE

CROSS-REFERENCE TO RELATED APPLICATIONS

This application claims the benefit of U.S. Provisional Application No. 62/592,731, filed on Nov. 30, 2017. The entire disclosure of the above application is incorporated herein by reference.

FIELD

The present disclosure relates to a variable position vehicle hood stay device.

BACKGROUND

This section provides background information related to the present disclosure and is not necessarily prior art.

Vehicles typically include a hood stay rod for holding the vehicle's hood in a fixed open position in order to allow hands-free access to the vehicle's engine compartment. Typically, the hood stay rod is a slender, metal rod with a proximal end pivotably attached to the vehicle body and a distal end configured to engage an aperture or other mating feature on the hood. The user typically must manually hold the hood open with one hand while manipulating the hood stay rod until the distal end engages and supports the hood. In certain situations, properly engaging the hood stay rod with the mating feature of the hood can be difficult, such as in low light conditions for example. It can also be difficult for some users to physically hold the hood in the proper position in order to engage the hood stay rod, such as if the user is shorter in height or has less arm range of motion than the average person used to design the hood stay rod. For such shorter users, the hood need not remain open as far in order for adequate access to the engine compartment, yet the typical hood stay rod is only designed to hold the hood open at a single angular position. Thus, there exists a need for improved hood stay devices.

SUMMARY

This section provides a general summary of the disclosure, and is not a comprehensive disclosure of its full scope or all of its features.

In accordance with an aspect of the present disclosure, a hood stay device for a vehicle that has a hood and a body includes a housing, a support member, and a latch member. The housing defines a housing cavity. A proximal end of the housing is adapted to be pivotably coupled to one of the hood or the body of the vehicle. An inner end of the support member is disposed within the housing cavity. The support member extends through a distal end of the housing to an outer end of the support member that is disposed external of the housing. The support member is slidable relative to the housing along a support axis. The support member includes a plurality of teeth arranged in a rack along the support axis. The outer end of the support member is pivotably coupled to the other one of the hood or the body of the vehicle. The latch member is coupled to the housing and movable between a locked position and an unlocked position relative to the housing. When the latch member is in the locked position the latch member engages the teeth to inhibit movement of the support member along the support axis. When the latch member is in the unlocked position the latch member is spaced apart from the teeth to permit movement of the support member along the support axis.

In accordance with an aspect of the present disclosure, the proximal end of the housing is pivotably coupled to the body and the outer end of the support member is pivotably coupled to the hood.

In accordance with an aspect of the present disclosure, the latch member includes a pivot end and a lock end. The pivot end is pivotably coupled to the housing. The lock end is configured to engage the teeth.

In accordance with an aspect of the present disclosure, the hood stay device further includes a yolk that is coupled to the housing and is slidable relative to the housing along the support axis. The pivot end of the latch member is pivotably coupled to the yolk.

In accordance with an aspect of the present disclosure, the hood stay device further includes a fastener. The fastener has a head exterior of the housing and the fastener extends through an aperture in the housing and is threadably coupled to the yolk within the housing cavity.

In accordance with an aspect of the present disclosure, the hood stay device further includes a spring. The spring is coupled to the latch member and configured to bias the latch member toward the teeth.

In accordance with an aspect of the present disclosure, the hood stay device further includes a knob coupled to the housing and configured to rotate relative to the housing about a knob axis that is transverse to the support axis. The knob is translatable along the knob axis. One end of the spring is coupled to the latch member and an opposite end of the spring is coupled to the knob.

In accordance with an aspect of the present disclosure, the hood stay device further includes a detent member fixedly coupled to the housing and having an outer surface that defines a lock position aperture. The knob includes a protrusion and is rotatable between an unlocked position and a locked position. When the knob is in the locked position, the protrusion aligns with the lock position aperture to be received therein.

In accordance with an aspect of the present disclosure, the outer surface of the detent member includes an unlocked position recess. The unlocked position recess extends axially into the detent member a distance that is less than the distance of the lock position aperture. When the knob is in the unlocked position, the protrusion aligns with the unlocked position recess to be received therein.

In accordance with an aspect of the present disclosure, when the knob is in the unlocked position, the lock end of the latch member is disengaged from the teeth and when the knob is in the locked position, the lock end of the latch member is engaged with the teeth.

In accordance with an aspect of the present disclosure, the detent member includes two lock position apertures and two unlocked position recesses. The lock position apertures are diametrically opposite of each other relative to the knob axis. The unlocked position recesses are diametrically opposite each other relative to the knob axis. The knob includes two protrusions diametrically opposite to each other relative to the knob axis.

In accordance with an aspect of the present disclosure, the knob includes a knob body and a pivot shaft. The knob body is disposed external of the housing. A proximal end of the pivot shaft is coupled to the knob body and a distal end of the pivot shaft is coupled to the spring within the housing cavity.

In accordance with an aspect of the present disclosure, the housing includes a pair of housing halves coupled together by threaded fasteners.

In accordance with an aspect of the present disclosure, the housing defines a channel having a predetermined shape. A side of the support member that is opposite the teeth has a mating predetermined shape configured to slidably be received in the channel.

In accordance with an aspect of the present disclosure, the latch member is pivotably coupled to a wall of the housing that is opposite the channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a variable position hood stay device. The hood stay device permits a user to open the hood of the vehicle and lock the hood into different open positions without needing to manually move the hood stay device into engagement with the hood. The hood stay device also provides a more stable support for the hood than typical hood stay rods. While the hood stay device of the example provided is illustrated as supporting a front hood above an engine compartment, other configurations can be used, such as to support a lid member of a front or rear cargo compartment (e.g., a trunk or rear hatch) for example.

Figure 1:
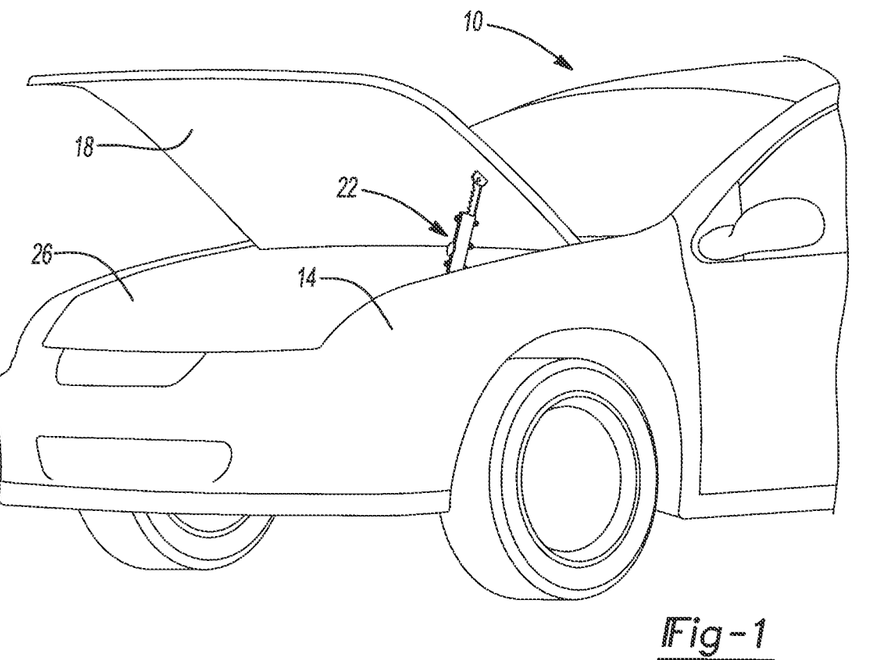
FIG. 1 is a perspective view of an example vehicle including a hood stay device in accordance with the present teachings.
Figure 2:
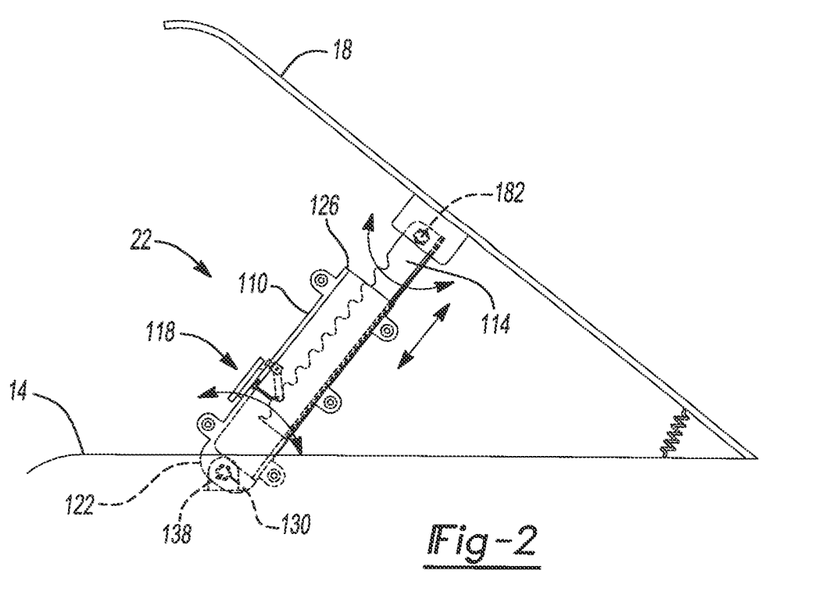
FIG. 2 is a side view of the hood stay device of FIG. 1.

With reference to FIG. 1, a front portion of an example of a vehicle 10 is illustrated. The vehicle 10 has a vehicle body 14, a lid member 18, and a stay device 22. The vehicle body 14 defines a cavity 26, such as an engine compartment or cargo compartment. The lid member 18 is coupled to the vehicle body 14 such that the lid member 18 is movable between a closed position and a plurality of open positions relative to the vehicle body 14. In the example provided, the lid member 18 is generally pivotably coupled to the vehicle body 14 such that the lid member 18 is able to pivot between the closed position and the open positions. In the closed position, the lid member 18 covers the top opening of the cavity 26 to generally close the cavity 26 from exterior access.

With additional reference to FIGS. 2-5, the stay device 22 includes a housing 110, a support member 114, and a latch assembly 118. The housing includes a proximal end 122 and a distal end 126. The proximal end 122 of the housing 110 includes a housing mount 130 that couples the housing 110 to the vehicle body 14. In an alternative construction, not specifically shown, the housing mount 130 couples the housing 110 to a different fixed structure of the vehicle 10, such as a vehicle frame for example. In the example provided, the housing mount 130 is a pivot mount that is attached to the vehicle body 14 such that the housing 110 is pivotable relative to the vehicle body 14 about the housing mount 130. In the example provided, the housing mount 130 includes a hole 134 through the proximal end 122 of the housing 110 and a pin 138 attached to the vehicle body 14 is pivotably received through the hole 134, though other configurations can be used to permit pivoting of the housing 110 relative to the vehicle body 14.

Figure 3:
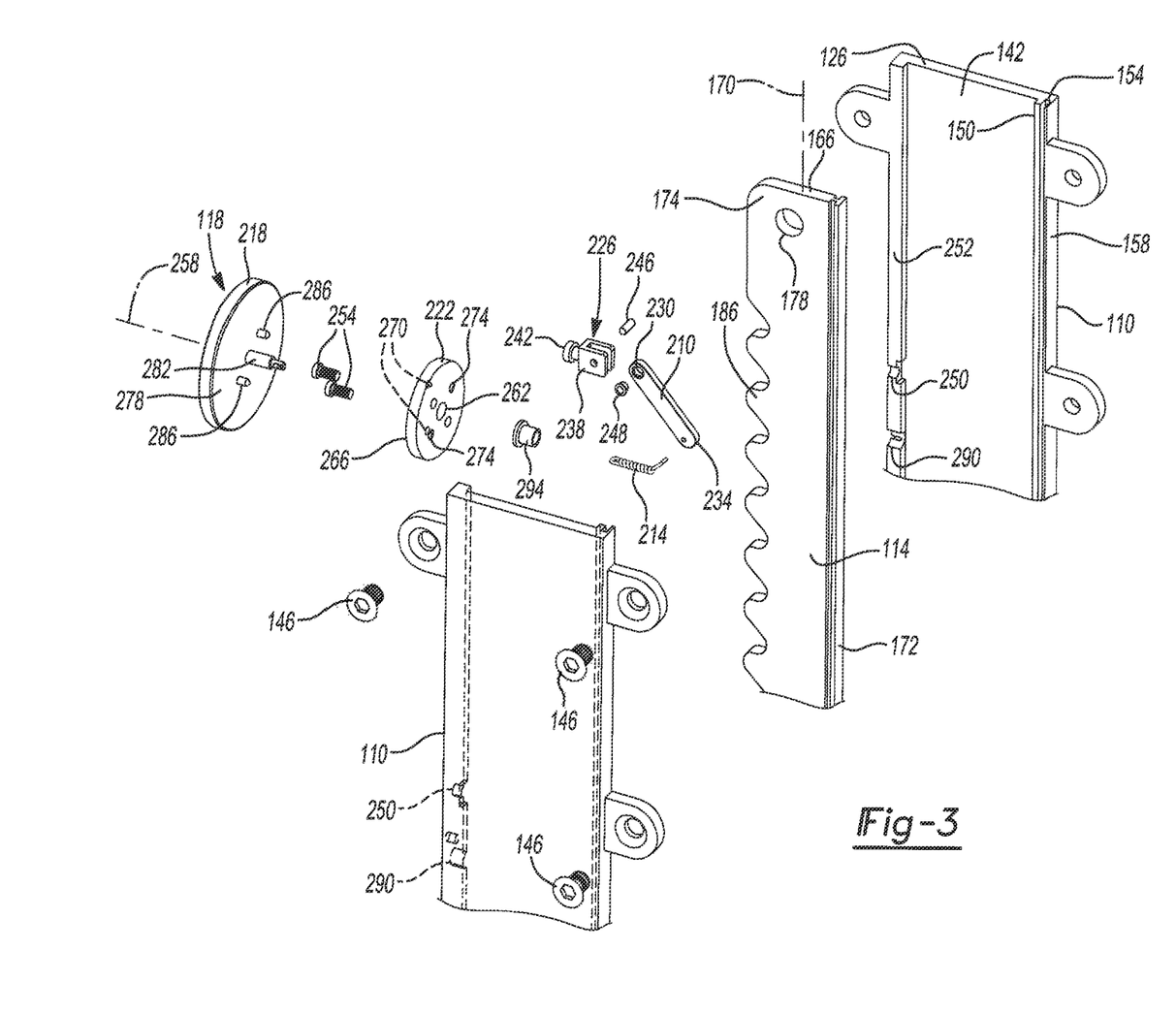
FIG. 3 is an exploded perspective view of the hood stay device of FIG. 1.
Figure 4:
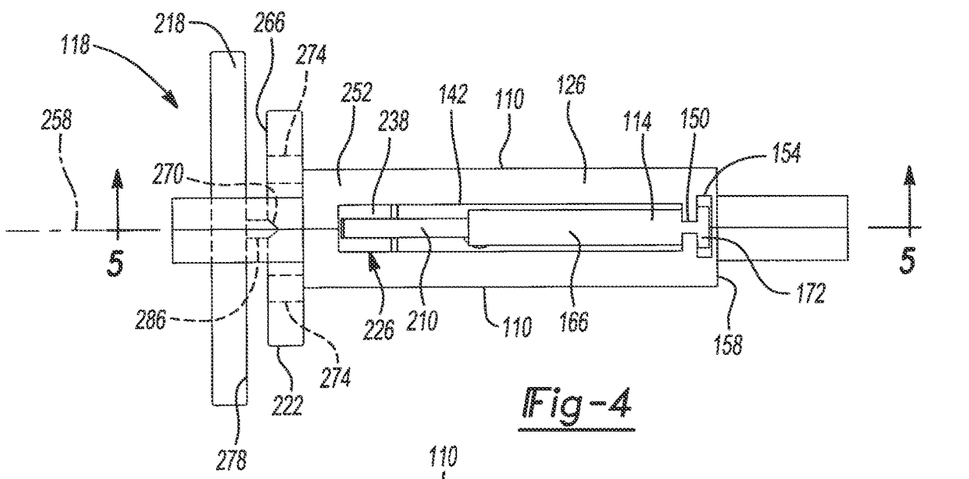
FIG. 4 is a top view of the hood stay device of FIG. 1.
Figure 5:
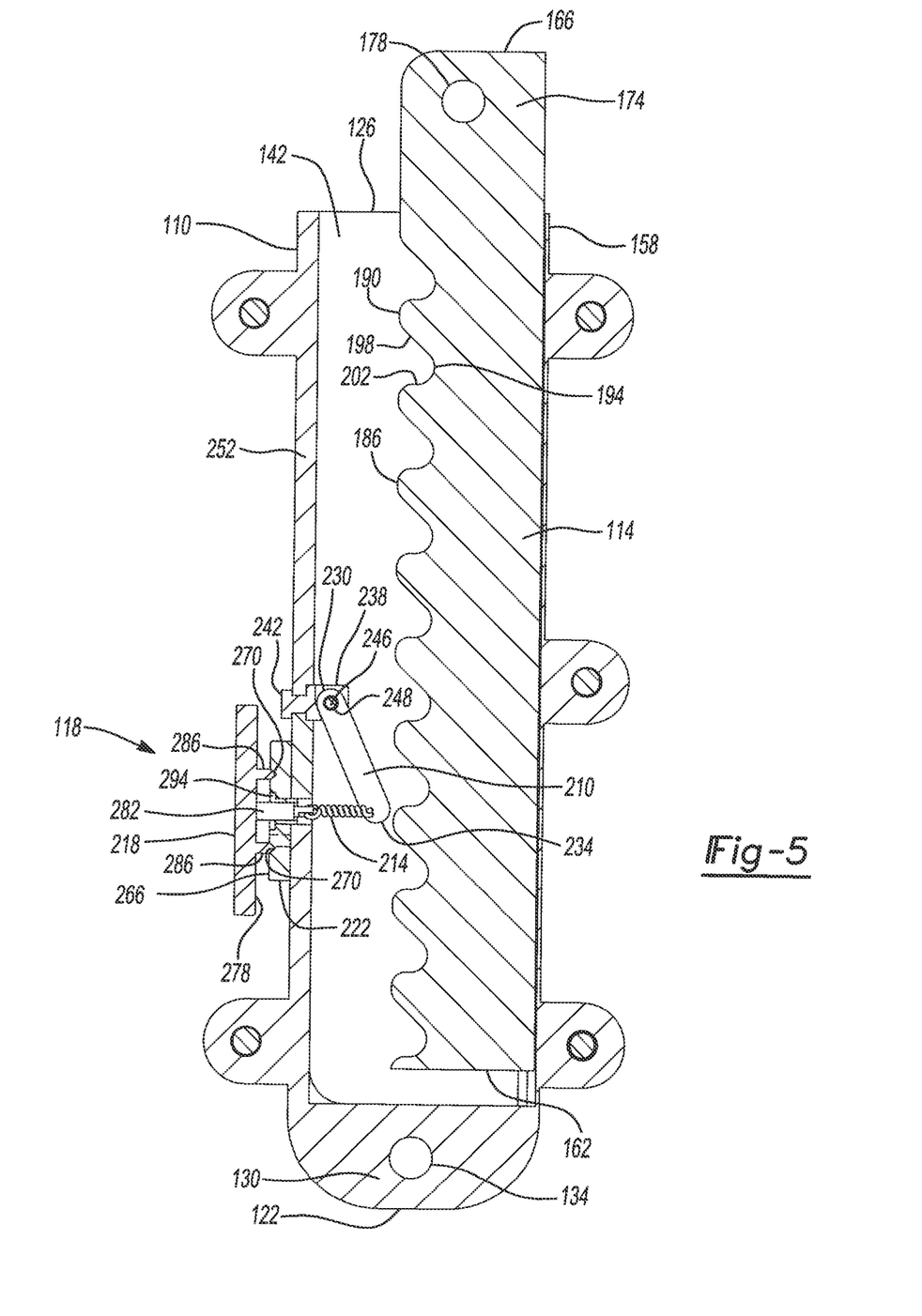
FIG. 5 is a sectional view of the hood stay device of FIG. 1.

The housing 110 is generally hollow and defines a housing cavity 142 that is open at the distal end 126 of the housing 110 and closed at the proximal end 122 of the housing 110. In the example provided, the housing 110 includes two halves that are coupled together by threaded fasteners 146 (e.g., bolts or screws) to define the housing cavity 142, though other constructions can be used (e.g., welding). In the example provided, the housing cavity 142 is a generally rectangular cavity (as best shown in FIGS. 3-5) and the housing 110 also includes a rack guide 150 disposed within the housing cavity 142. The rack guide 150 defines a recess or channel 154 having a predetermined shape (e.g., rectangular). The rack guide 150 is fixedly coupled to a wall 158 of the housing 110 such that the channel 154 is disposed within the housing cavity 142. In an alternative construction, not specifically shown, the rack guide 150 is integrally formed with the wall 158 of the housing 110. In the example provided, the rack guide 150 extends the predominant length of the housing cavity 142 and extends to the open distal end 126 of the housing 110.

The support member 114 has an inner end 162 and an outer end 166. The inner end 162 of the support member 114 is disposed within the housing cavity 142 and the support member 114 extends along a support axis 170 from the inner end 162, through the opening in the distal end 126 of the housing 110, to the outer end 166 of the support member 114. One side of the support member 114 includes a guide rail 172 having a predetermined shape that matingly fits with the predetermined shape of the channel 154 of the rack guide 150, such that the support member 114 is slidably received in the channel 154. The support member 114 slides axially along the support axis 170 relative to the rack guide 150, while the rack guide 150 inhibits movement of the support member 114 in other directions relative to the housing 110. Thus, the support member 114 is in sliding engagement with the rack guide 150 of the housing 110.

The outer end 166 of the support member 114 includes a support mount 174 that is coupled to the lid member 18 of the vehicle 10. The support mount 174 is a pivot mount that is attached to the lid member 18 such that the support member 114 is pivotable relative to the lid member 18 about the support mount 174. In the example provided, the support mount 174 includes a hole 178 through the outer end 166 of the support member 114 and a pin 182 attached to the lid member 18 is pivotably received through the hole 178, though other configurations can be used to permit pivoting of the support member 114 relative to the lid member 18.

The support member 114 further includes a plurality of teeth 186 that are linearly arranged to form a rack on the side of support member 114 that is opposite the side that engages the channel 154. The teeth 186 face and extend outward, away from the channel 154. The teeth 186 are arranged adjacent to each other in the axial direction along the support axis 170, starting near the inner end 162 of the support member 114 and continuing axially toward the outer end 166 of the support member 114. In the example provided, each tooth includes a peak 190 and forms a trough 194 between adjacent ones of the teeth 186. In the example provided, a bottom surface 198 of each tooth 186 faces generally toward the inner end 162 of the support member 114 (e.g., toward the housing mount 130 and vehicle body 14) and a top surface 202 of each tooth 186 faces generally upward toward the outer end 166 of the support member 114 (e.g., toward the support mount 174 and the lid member 18). In the example provided, the top surface 202 of each tooth 186 is concave, such that the bottom surface 198 of that tooth 186 extends further downward (e.g., toward the inner end 162 of the support member 114) than the highest point of the peak 190 of the tooth 186.

Figure 6:
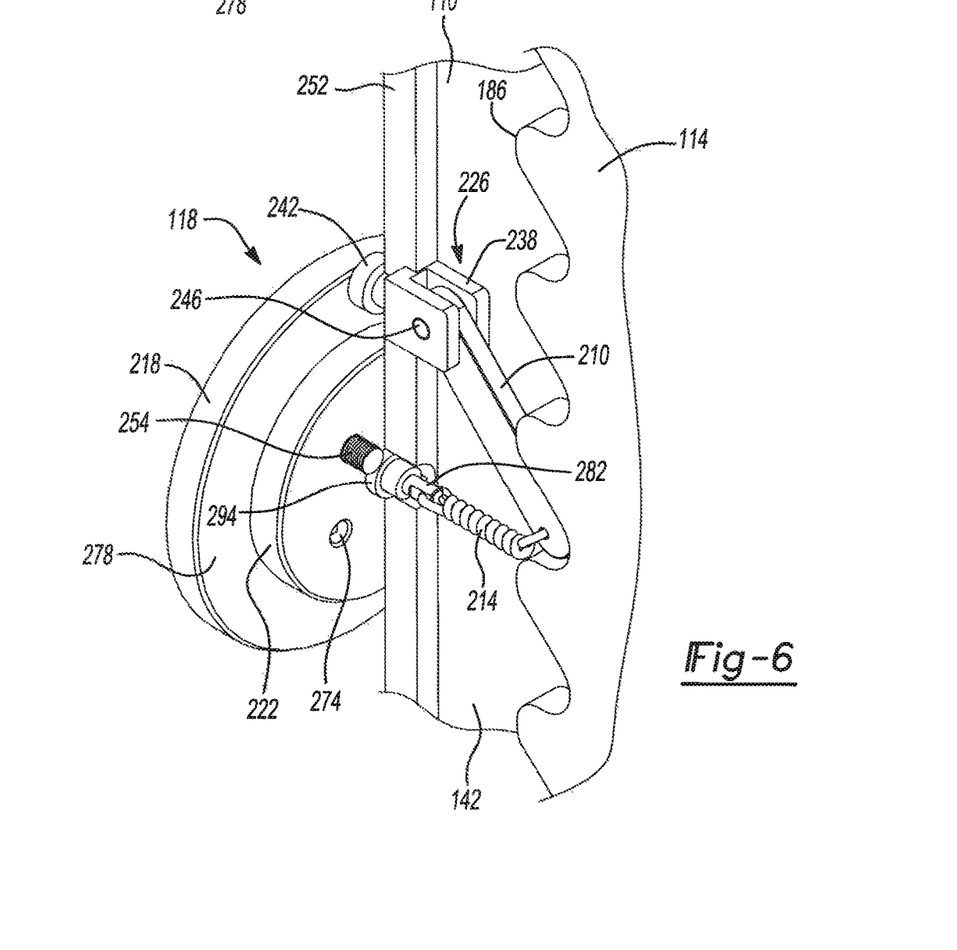
FIG. 6 is a cut-away view of a portion of the hood stay device of FIG. 1.

With continued reference to FIGS. 2-5 and additional reference to FIG. 6, the latch assembly 118 includes a latch member 210, a spring 214, a knob 218, a detent member 222, and a latch mount 226. The latch mount 226 is attached to the housing 110 and extends within the housing cavity 142. The latch member 210 is disposed within the housing cavity 142 and has a pivot end 230 and a lock end 234. The pivot end 230 is pivotably coupled to the latch mount 226 such that the latch member 210 pivots relative to the housing 110 about the latch mount 226. In the example provided, the latch mount 226 includes a yolk 238 and a bolt 242. The yolk 238 is disposed within the housing cavity 142 and is pivotably coupled to the pivot end 230 of the latch member 210 by a pin 246. In the example provided, a bearing or bushing 248 is disposed radially between the latch member 210 and the pin 246. The bolt 242 extends through an aperture 250 in the housing and threadably engages the yolk 238 to couple the yolk 238 to the housing 110. When the bolt 242 is screwed into the yolk 238, a head of the bolt 242 seats on an exterior surface of a wall 252 of the housing 110 that is opposite the wall 158, and the threaded shaft portion of the bolt 242 extends into the housing cavity 142. In an alternative construction, not specifically shown, the aperture 250 is a slot that extends in the axial direction a relatively small distance to permit the latch mount 226 to slide axially a small distance within the aperture 250.

The lock end 234 of the latch member 210 is configured to fit between adjacent ones of the teeth 186 such that the lock end 234 is capable of resting in a corresponding one of the troughs 194. In the example provided, the lock end 234 is rounded and optionally includes a roller (not shown) configured to rotate and roll along the surfaces of the teeth 186.

The detent member 222 is fixedly mounted to the wall 252 of the housing 110, such as by screws 254. The detent member 222 is disposed about a knob axis 258 and includes a bore 262 disposed about the knob axis 258 and extending through the detent member 222. An outer surface 266 of the detent member 222 faces away from the wall 252 and includes an unlocked position recess 270 and a locked position aperture 274. In the example provided, the outer surface 266 include a pair of the unlocked position recesses 270 and a pair of the locked position apertures 274. In the example provided, the unlocked position recesses 270 are diametrically opposite of each other relative to the knob axis 258 and the locked position apertures 274 are diametrically opposite each other relative to the knob axis 258. The unlocked position recesses 270 and the locked position apertures 274 are located a same radial distance from the knob axis 258. The unlocked position recesses 270 are offset or spaced apart in the circumferential direction from the locked position apertures 274 by a predetermined angle about the knob axis 258. In the example provided, the predetermined angle is approximately 15 degrees, though other configurations can be used. The locked position apertures 274 extend a greater axial distance from the outer surface 266 into the detent member 222 than the unlocked position recesses 270. In the example provided, the locked position apertures 274 can extend through the detent member 222, while the unlocked position recesses 270 do not extend fully through the detent member 222.

The knob 218 is rotatably mounted to the wall 252 of the housing 110 such that the knob 218 rotates relative to the housing 110 and the detent member 222 about the knob axis 258. The knob 218 includes a cylindrical knob body 278, a pivot shaft 282, and a protrusion 286. In the example provided, the knob body 278 and pivot shaft 282 are disposed about the knob axis 258. The pivot shaft 282 is fixedly coupled to the knob body 278 and extends axially from a side of the knob body 278 that faces the wall 252 of the housing 110. The pivot shaft 282 extends through the bore 262 of the detent member 222 and through a bore 290 in the wall 252 such that a distal end of the pivot shaft 282 is disposed within the housing cavity 142. In the example provided, a bearing or bushing 294 is disposed about the pivot shaft 282 radially between the pivot shaft 282 and the bore 262 of the detent member 222.

The protrusion 286 extends from the side of the knob body 278 that faces toward the wall 252 of the housing 110 and from a location on the knob body 278 that is radially outward from the knob axis 258 a distance equal to that of the unlocked position recesses 270 and the locked position apertures 274. The protrusion 286 is configured to be received in the unlocked position recesses 270 and the locked position apertures 274 depending on the angular position of the knob body 278. When the protrusion 286 is received in the one of the unlocked position recesses 270 or the locked position apertures 274, engagement between the protrusion 286 and that recess or aperture inhibits rotation of the knob body 278 relative to the housing 110. When the knob body 278 is in a rotational position such that the protrusion 286 is not aligned with the unlocked position recess 270 or the locked position aperture 274, the protrusion 286 is configured to abut the outer surface 266 of the detent member 222 to inhibit axial movement of the knob body 278 further toward the wall 252. In the example provided, the knob 218 includes two of the protrusions 286 and the two protrusions 286 are diametrically opposite of each other relative to the knob axis 258. Thus, when the knob 218 is in a locked rotational position, both protrusions 286 are received in the locked position apertures 274, and when the knob 218 is in an unlocked rotational position, both protrusions 286 are received in the unlocked position recesses 270.

The spring 214 is disposed within the housing cavity 142 and couples the knob body 278 to the latch member 210. One end of the spring 214 is attached to the latch member 210 proximate to the lock end 234. The other end of the spring 214 is attached to the distal end of the pivot shaft 282 of the knob body 278. In the example provided, the spring 214 is a compression and extension spring such that when the lock end 234 is moved a predetermined distance away from the wall 252 toward the teeth 186, the spring 214 biases the lock end 234 toward the wall 252 away from the teeth 186, and if the lock end 234 is moved a predetermined distance toward the wall 252 away from the teeth 186, then the spring 214 biases the lock end 234 away from the wall toward the teeth 186.

In the example provided, when the lock end 234 is seated in one of the troughs 194 of the teeth 186 and the protrusions 286 are seated in the locked position apertures 274 (as shown in FIG. 5), the spring 214 biases the lock end 234 in the direction toward the wall 252. In the example provided, when the lock end 234 is disengaged from the teeth 186 and the protrusions 286 are seated in the unlocked position recesses 270, the spring 214 is in its natural state and is neither in extension nor in compression. In the example provided, when the lock end 234 is disengaged from the teeth 186 and the knob 218 is pulled outward such that the protrusions 286 are not in the unlocked position recesses 270 or the locked position apertures 274, the spring 214 biases the lock end 234 in the direction toward the teeth 186. The spring 214 also biases the knob body 278 toward the wall 252 to retain the protrusions 286 in either the unlocked position recesses 270 or the locked position apertures 274.

In operation, when the lid member 18 of the vehicle 10 is closed, the knob 218 is in the unlocked rotational position, such that the lock end 234 is not engaged with the teeth 186 and the user is able to open the lid member 18 and access the knob 218. Once the lid member 18 is at an angular position that the user deems to be adequate to access the cavity 26 of the vehicle 10, the user holds the lid member 18 in that adequate position and turns the knob body 278 until the protrusions 286 enter the locked position apertures 274. With the protrusions 286 in the locked position apertures 274, the spring 214 biases the lock end 234 into engagement with the teeth 186. When the lock end 234 is in engagement with the teeth 186, the latch member 210 inhibits axial movement of the support member 114 relative to the housing 110, and thus inhibits movement of the lid member 18 relative to the vehicle body 14. Since the support member 114 includes a plurality of teeth 186, the lid member 18 is capable of being locked into place in a number of positions that correspond to the teeth 186. In other words, the lid member 18 is permitted to be locked into place at a number of angular positions relative to the vehicle body 14. When the user desires to close the lid member 18, the user holds the hood and rotates the knob body 278 until the protrusions 286 enter the unlocked position recesses 270. With the protrusions 286 in the unlocked position recesses 270, the latch member 210 is disengaged from the teeth 186 and the user is able to close the lid member 18.

In an alternative construction, not specifically shown, the housing mount 130 is pivotably coupled to the lid member 18 and the support mount 174 is pivotably coupled to the vehicle body 14 or another fixed portion of the vehicle 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hood stay device for a vehicle having a hood and a body, the hood stay device comprising:
    a housing defining a housing cavity, a proximal end of the housing being adapted to be pivotably coupled to one of the hood or the body of the vehicle;
    a support member, an inner end of the support member being disposed within the housing cavity, the support member extending through a distal end of the housing to an outer end of the support member disposed external of the housing, the support member being slidable relative to the housing along a support axis, the support member including a plurality of teeth arranged in a rack along the support axis, the outer end of the support member being pivotably coupled to the other one of the hood or the body of the vehicle; and
    a latch member coupled to the housing and movable between a locked position and an unlocked position relative to the housing, the latch member including a pivot end and a lock end, the pivot end being pivotably coupled to the housing, the lock end being configured to engage the teeth, wherein when the latch member is in the locked position the latch member engages the teeth to inhibit movement of the support member along the support axis, and wherein when the latch member is in the unlocked position the latch member is spaced apart from the teeth to permit movement of the support member along the support axis.

2. The hood stay device of claim 1, wherein the proximal end of the housing is pivotably coupled to the body and the outer end of the support member is pivotably coupled to the hood.

3. The hood stay device of claim 1, further comprising a yolk that is coupled to the housing and is slidable relative to the housing along the support axis, the pivot end of the latch member being pivotably coupled to the yolk.

4. The hood stay device of claim 3, further comprising a fastener, the fastener having a head exterior of the housing and the fastener extending through an aperture in the housing and being threadably coupled to the yolk within the housing cavity.

5. The hood stay device of claim 1, further comprising a spring, the spring being coupled to the latch member and configured to bias the latch member toward the teeth.

6. The hood stay device of claim 5, further comprising a knob coupled to the housing and configured to rotate relative to the housing about a knob axis that is transverse to the support axis, the knob being translatable along the knob axis, wherein one end of the spring is coupled to the latch member and an opposite end of the spring is coupled to the knob.

7. The hood stay device of claim 6, further comprising a detent member fixedly coupled to the housing and having an outer surface that defines a lock position aperture, wherein the knob includes a protrusion and is rotatable between an unlocked position and a locked position, and wherein when the knob is in the locked position the protrusion aligns with the lock position aperture to be received therein.

8. The hood stay device of claim 7, wherein the outer surface of the detent member includes an unlocked position recess, the unlocked position recess extends axially into the detent member a distance that is less than the distance of the lock position aperture, wherein when the knob is in the unlocked position the protrusion aligns with the unlocked position recess to be received therein.

9. The hood stay device of claim 8, wherein when the knob is in the unlocked position the lock end of the latch member is disengaged from the teeth and when the knob is in the locked position the lock end of the latch member is engaged with the teeth.

10. The hood stay device of claim 7, wherein the detent member includes two lock position apertures and two unlocked position recesses, the lock position apertures being diametrically opposite of each other relative to the knob axis, the unlocked position recesses being diametrically opposite each other relative to the knob axis, and the knob includes two protrusions diametrically opposite to each other relative to the knob axis.

11. The hood stay device of claim 6, wherein the knob includes a knob body and a pivot shaft, the knob body being disposed external of the housing, a proximal end of the pivot shaft being coupled to the knob body and a distal end of the pivot shaft being coupled to the spring within the housing cavity.

12. A hood stay device for a vehicle having a hood and a body, the hood stay device comprising:
- a housing defining a housing cavity, a proximal end of the housing being adapted to be pivotably coupled to one of the hood or the body of the vehicle;
- a support member, an inner end of the support member being disposed within the housing cavity, the support member extending through a distal end of the housing to an outer end of the support member disposed external of the housing, the support member being slidable relative to the housing along a support axis, the support member including a plurality of teeth arranged in a rack along the support axis, the outer end of the support member being pivotably coupled to the other one of the hood or the body of the vehicle;
- a latch member coupled to the housing and movable between a locked position and an unlocked position relative to the housing, wherein when the latch member is in the locked position the latch member engages the teeth to inhibit movement of the support member along the support axis, and wherein when the latch member is in the unlocked position the latch member is spaced apart from the teeth to permit movement of the support member along the support axis; and
- the housing includes a pair of housing halves coupled together by threaded fasteners.

13. A hood stay device for a vehicle having a hood and a body, the hood stay device comprising:
- a housing defining a housing cavity, a proximal end of the housing being adapted to be pivotably coupled to one of the hood or the body of the vehicle;
- a support member, an inner end of the support member being disposed within the housing cavity, the support member extending through a distal end of the housing to an outer end of the support member disposed external of the housing, the support member being slidable relative to the housing along a support axis, the support member including a plurality of teeth arranged in a rack along the support axis, the outer end of the support member being pivotably coupled to the other one of the hood or the body of the vehicle;
- a latch member coupled to the housing and movable between a locked position and an unlocked position relative to the housing, wherein when the latch member is in the locked position the latch member engages the teeth to inhibit movement of the support member along the support axis, and wherein when the latch member is in the unlocked position the latch member is spaced apart from the teeth to permit movement of the support member along the support axis; and
- the housing defines a channel having a predetermined shape and a side of the support member that is opposite the teeth has a mating predetermined shape configured to slidably be received in the channel.

14. The hood stay device of claim 13, wherein the latch member is pivotably coupled to a wall of the housing that is opposite the channel.

* * * * *